United States Patent
Taya et al.

(10) Patent No.: US 10,836,921 B2
(45) Date of Patent: Nov. 17, 2020

(54) INK, INK CARTRIDGE, AND INK JET RECORDING METHOD

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP); Yutaka Yoshimasa, Yokohama (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 15/838,883

(22) Filed: Dec. 12, 2017

(65) Prior Publication Data

US 2018/0179408 A1    Jun. 28, 2018

(30) Foreign Application Priority Data

Dec. 22, 2016 (JP) .................................. 2016-249829

(51) Int. Cl.
*C09D 11/38* (2014.01)
*C09D 11/322* (2014.01)
(Continued)

(52) U.S. Cl.
CPC ................. *C09D 11/38* (2013.01); *B41J 2/05* (2013.01); *B41J 2/17503* (2013.01); *C09D 11/322* (2013.01); *C09D 11/328* (2013.01)

(58) Field of Classification Search
CPC .............................................. C09D 11/30–50
See application file for complete search history.

(56) References Cited

U.S. PATENT DOCUMENTS 4,632,703 A    12/1986  Koike et al.
4,853,036 A     8/1989  Koike et al.
(Continued)

FOREIGN PATENT DOCUMENTS

JP    H03100080 A     4/1991
JP    H03-255171 A   11/1991
(Continued)

OTHER PUBLICATIONS

English translation of JP 2015/007175, Jan. 2015; 40 pages.*
(Continued)

*Primary Examiner* — Helene Klemanski
(74) *Attorney, Agent, or Firm* — Venable LLP

(57) ABSTRACT

An aqueous ink for ink jet includes a coloring material, a solvent, and a surfactant having an HLB value of 9.0 or less. The solvent includes a solvent A having a solubility in water at 20° C. of 5.00 g/100 g-$H_2O$ or less and a solvent B other than the solvent A. The solvent A includes an alcohol having a vapor pressure at 20° C. of 0.5 mmHg or less and a surface tension of 30.0 mN/m or more. The content of the alcohol in the aqueous ink is 0.7 or more times the solubility in water at 20° C. in an equal amount to the aqueous ink. The solvent B has a partition coefficient ($P_B$) satisfying the following equation (1).

$$1.44 \log P_A - 0.1x - 3.4 \leq \log P_B \leq -0.6 \quad (1)$$

6 Claims, 2 Drawing Sheets

(51) Int. Cl.
*B41J 2/05* (2006.01)
*B41J 2/175* (2006.01)
*C09D 11/328* (2014.01)

(56) References Cited

U.S. PATENT DOCUMENTS

| | | | |
|---|---|---|---|
| 4,923,515 A | 5/1990 | Koike et al. | |
| 4,986,850 A | 1/1991 | Iwata et al. | |
| 5,067,980 A | 11/1991 | Koike et al. | |
| 5,099,255 A | 3/1992 | Koike et al. | |
| 5,101,217 A | 3/1992 | Iwata et al. | |
| 5,124,718 A | 6/1992 | Koike et al. | |
| 5,250,121 A | 10/1993 | Yamamoto et al. | |
| 5,358,558 A | 10/1994 | Yamamoto et al. | |
| 5,441,561 A * | 8/1995 | Chujo | C09D 11/30 106/31.28 |
| 5,658,376 A | 8/1997 | Noguchi et al. | |
| 5,772,741 A | 6/1998 | Spinelli | |
| 5,952,414 A * | 9/1999 | Noguchi | C09D 11/30 523/161 |
| 6,726,757 B2 * | 4/2004 | Sarkisian | C09D 11/30 106/31.58 |
| 7,638,561 B2 | 12/2009 | Fu et al. | |
| 8,226,756 B2 | 7/2012 | Akiyama et al. | |
| 8,328,341 B2 | 12/2012 | Koike et al. | |
| 8,328,926 B2 | 12/2012 | Koike et al. | |
| 8,408,691 B2 | 4/2013 | Koike et al. | |
| 8,506,067 B2 | 8/2013 | Koike et al. | |
| 2005/0282930 A1 | 12/2005 | Fu et al. | |
| 2007/0229636 A1 * | 10/2007 | Mubarekyan | C09D 11/30 347/100 |
| 2010/0173079 A1 | 7/2010 | Akiyama et al. | |
| 2017/0210919 A1 | 7/2017 | Yoshimasa et al. | |
| 2017/0210926 A1 | 7/2017 | Kawamura et al. | |
| 2017/0210927 A1 | 7/2017 | Kawamura et al. | |
| 2017/0369725 A1 * | 12/2017 | Mitsuyoshi | B41J 2/01 |
| 2018/0371272 A1 * | 12/2018 | Kawamura | B41J 2/17503 |
| 2019/0031900 A1 * | 1/2019 | Ootsuka | C09D 11/322 |

FOREIGN PATENT DOCUMENTS

| | | |
|---|---|---|
| JP | H09111165 A | 4/1997 |
| JP | H1046069 A | 2/1998 |
| JP | 2000-297237 A | 10/2000 |
| JP | 2003503535 A | 1/2003 |
| JP | 2003192968 A | 7/2003 |
| JP | 2006022328 A | 1/2006 |
| JP | 2010155989 A | 7/2010 |
| JP | 2014055271 A | 3/2014 |
| JP | 2015-007175 A | 1/2015 |
| WO | 00/78876 A1 | 12/2000 |

OTHER PUBLICATIONS

"Surfynol 400 Series Surfactants Data Sheet" by Air Products & Chemicals, Inc., everwin-sh.com.cn/admin/uploadpic/201503/20150305101905620.pdf, 2004; 6 pages.*

Mar. 28, 2018 extended European Search Report in European Patent Appln. No. 17208345.3.

Japanese Office Action issued in corresponding Japanese Application No. 2016-249829 dated Sep. 8, 2020.

* cited by examiner

INK, INK CARTRIDGE, AND INK JET RECORDING METHOD

BACKGROUND OF THE INVENTION

Field of the Invention

The present invention relates to an ink, an ink cartridge, and an ink jet recording method.

Description of the Related Art

An ink jet recording method has advantages including low noise, low running cost, easy downsizing of apparatuses, and easy printing of color images. Hence, the method is now widely applied to not only printers but also copying machines and other apparatuses.

In the recording method, the size of ink droplets has become much finer in order to achieve higher definition images, and there is a demand for higher reliability of the quality of images as well as higher definition images. In such a circumstance, an especially important subject is the improvement of intermittent ejection characteristics (also called "initial ejection performance"). When, in the recording method, an ink is not ejected from some ejection openings of a recording head over a long period of time and the recording head is not subjected to recovery operation, water or a similar component in the ink evaporates from the ejection openings to cause viscosity increase of the ink due to drying or to cause the ink to adhere to the nozzles. When the ink is then intended to be ejected once again from the ejection openings, the initial ink ejection is unstable, or the ink cannot be ejected (ejection failure), and a resulting image may be disturbed.

Especially in recent years, an ink jet recording method using a line-type recording head (hereinafter also called "line head") in which ejection openings (nozzles) for ejecting an ink are arranged across the full width (maximum paper width) in the conveyance direction of a recording medium has been adopted. In the recording method using a line head, reciprocation of the head is not required. While the head is fixed, a recording medium is conveyed under the head, then an ink is applied to the recording medium, and thus an image can be recorded in a single pass manner. As compared with a recording method using a serial-type recording head that is reciprocated from side to side (in the width direction of a recording medium) to perform recording on a conveying recording medium, the recording method using a line head can advantageously reduce the time for recording.

Meanwhile, the serial type recording head passes over every recording position on a recording medium a plurality of times. Hence, even if a malfunction occurs in one nozzle, the other nozzles can compensate for the malfunction to suppress the lowering of image qualities. In contrast, in the recording method using a line head, the line head passes over every recording position on a recording medium only once. Hence, if unstable ejection or ejection failure occurs even in one nozzle, this can immediately cause the lowering of image qualities. On this account, intermittent ejection stability is an extremely important subject in the recording method using a line head.

As an example of the measure capable of improving the intermittent ejection stability, Japanese Patent Application Laid-Open No. H03-255171 discloses an ink for ink jet. The ink includes a coloring material and a liquid medium, and the liquid medium contains an alkylene glycol having 7 or more carbon atoms. Japanese Patent Application Laid-Open No. H03-255171 discloses that the technique can prevent a head from clogging after temporary halt of print.

Japanese Patent Application Laid-Open No. 2000-297237 discloses a recording liquid for ink jet. The recording liquid includes water, a coloring agent, and an ethylene glycol organic solvent, and the ethylene glycol organic solvent is contained in a larger amount than those of other organic solvents. Japanese Patent Application Laid-Open No. 2000-297237 discloses that the technique can improve a fault of normal ejection from an ejection opening that does not eject an ink in a low humidity environment for a certain period of time or more to cause a viscosity increase of the ink near the ejection opening due to water evaporation. Japanese Patent Application Laid-Open No. 2015-7175 discloses that a poorly water-soluble solvent dissolved in an ink is separated as oil droplets when water evaporates and forms an oil film, which suppresses evaporation.

SUMMARY OF THE INVENTION

The present invention is directed to providing an aqueous ink that contains a surfactant having a low HLB value but has excellent intermittent ejection stability, an ink cartridge including the ink, and an ink jet recording method using the ink.

According to an aspect of the present invention, there is provided an aqueous ink for ink jet, including a coloring material; a solvent; and a surfactant having an HLB value of 9.0 or less, in which the solvent includes a solvent A having a solubility in water at 20° C. of 5.00 g/100 g-$H_2O$ or less and a solvent B other than the solvent A, the solvent A includes an alcohol having a vapor pressure at 20° C. of 0.5 mmHg or less and a surface tension of 30.0 mN/m or more, a content of the alcohol in the aqueous ink is 0.7 or more times a solubility in water at 20° C. in an equal amount to the aqueous ink, and the solvent B has a partition coefficient ($P_B$) satisfying the relationship of the following the equation (1):

$$1.44 \text{ Log } P_A - 0.1x - 3.4 \leq \text{Log } P_B \leq -0.6 \quad (1)$$

(in the equation (1), $P_A$ represents a partition coefficient of the solvent A; and x represents a content (% by mass) of the solvent B based on a total mass of the aqueous ink).

Further features of the present invention will become apparent from the following description of exemplary embodiments with reference to the attached drawings.

DESCRIPTION OF THE EMBODIMENTS

Figure 1:
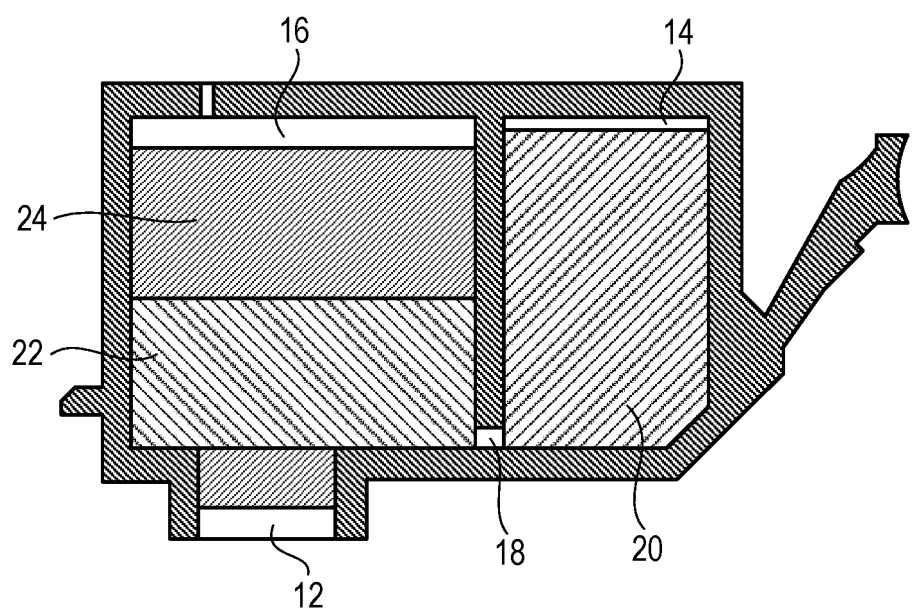
FIG. 1 is a schematic sectional view showing an ink cartridge in accordance with an embodiment of the present invention.

Preferred embodiments of the present invention will now be described in detail in accordance with the accompanying drawings.

The inventors of the present invention have evaluated the intermittent ejection stability of such a conventional ink as disclosed in Japanese Patent Application Laid-Open No. H03-255171 or Japanese Patent Application Laid-Open No. 2000-297237. The result reveals that once water in each ink starts to evaporate, the ink viscosity increases at the tips of nozzles as time proceeds, and the intermittent ejection stability markedly degrades.

The ink disclosed in Japanese Patent Application Laid-Open No. 2015-7175 and having the disclosed ink formulation has been ascertained to have sufficient effect. Meanwhile, it has been also revealed that the intermittent ejection stability markedly degrades when a hydrophobic surfactant having a low HLB (Hydrophile-Lipophile Balance) value is used. A surfactant having a low HLB value is widely used in an ink applied to recording media having no ink jet printability, such as plain paper and offset coated paper.

The present invention will now be more specifically described with reference to preferred embodiments, but the invention is not intended to be limited to the following embodiments. In the present specification, an aqueous ink for ink jet may be simply called "ink". Physical property values are values determined at normal temperature (25° C.) unless otherwise noted.

<Ink>

The inventors of the present invention have studied to improve the intermittent ejection stability of an ink containing a surfactant having a low HLB value of 9.0 or less. In the study, to suppress evaporation of water in an ink for the improvement in the intermittent ejection stability of the ink, the inventors of the present invention have used a solvent having a low solubility in water (solvent A) and a solvent other than the solvent A (solvent B) including a solvent having a high solubility in water, in an ink to intensively conduct examinations. As a result, the inventors have found that by using, as solvents contained in an ink, a particular solvent A in an amount within a particular range and a solvent B having a partition coefficient satisfying the equation (1), an ink having excellent intermittent ejection stability can be produced, and have accomplished the present invention.

An aqueous ink for ink jet in accordance with an embodiment of the present invention includes a coloring material, a solvent, and a surfactant having an HLB value of 9.0 or less. The ink contains, as the solvent, a solvent A having a solubility in water at 20° C. of 5.00 g/100 g-$H_2O$ or less and a solvent B other than the solvent A. The ink contains, as the solvent A, an alcohol having a vapor pressure at 20° C. of 0.5 mmHg or less and a surface tension of 30.0 mN/m or more. In the ink, the content of the alcohol (solvent A) is 0.7 or more times the solubility in water at 20° C. in an equal amount to the ink. In the ink, the solvent B has a partition coefficient ($P_B$) satisfying the following equation (1).

$$1.44 \text{ Log } P_A - 0.1x - 3.4 \leq \text{Log } P_B \leq -0.6 \quad (1)$$

(In the equation (1), $P_A$ represents the partition coefficient of the solvent A; and x represents the content (% by mass) of the solvent B based on the total mass of the aqueous ink)

Having the above constitution, an ink from which water is prevented from evaporating through ejection openings of a recording head to achieve good ejection characteristics over a long period of time can be provided. When the ink is used, good ejection characteristics can be maintained over a long period of time even in conditions in which water in an ink evaporates easily, for example, when a recording head is exposed to the atmosphere and is left in non-recording state for a long period of time.

The partition coefficient is an index indicating the hydrophobicity of a chemical substance. Two solvents of water and a solvent immiscible with water (hereinafter called "hydrophobic solvent") are placed in a container, then a chemical substance miscible with the two solvents is added, and the whole is stirred. In the resulting solution, the ratio of the concentrations of the chemical substance dissolved in the water and in the hydrophobic solvent is constant independent of the content of the chemical substance. The concentration ratio of the chemical substance in the water and in the hydrophobic solvent is called partition coefficient and is represented by the equation (2).

$$\text{Partition coefficient } P = \text{chemical substance concentration in hydrophobic solvent/chemical substance concentration in water} \quad (2)$$

Generally, the common logarithm of the concentration ratio (partition coefficient) (Log partition coefficient) is used. In the present specification, a partition coefficient is the value when n-octanol is used as the solvent immiscible with water.

[Surfactant]

An ink in an embodiment of the present invention is for suppressing the degradation of intermittent ejection stability when a surfactant having a low HLB value (specifically, an HLB value of 9.0 or less) is used, and thus contains a surfactant having an HLB value of 9.0 or less. As the surfactant, a surfactant conventionally used in an ink for ink jet can be suitably used. An ink containing a surfactant having an HLB value of 9.0 or less has no ink jet printability and exhibits good wettability with recording media having a hydrophobic surface, such as plain paper and offset coated paper that are likely to repel an ink. The surfactant is more preferably a nonionic surfactant having an HLB value of 8.0 or less.

The content of the surfactant having an HLB value of 9.0 or less is preferably 0.05% by mass or more to 2.00% by mass or less and more preferably 0.05% by mass or more to 1.00% by mass or less based on the total mass of the ink. When the content of the surfactant in an ink is 0.05% by mass or more, the wettability of the ink in a nozzle can be improved, and the ejection stability can be improved. When the content of the surfactant in an ink is 2.00% by mass or less, the viscosity increase of the ink can be suppressed when water in the ink evaporates at the tip of a nozzle, and the intermittent ejection stability can be increased. The ink may contain other surfactants in addition to the surfactant having an HLB value of 9.0 or less.

[Solvent]

The solvent is used for preventing water as a medium for a coloring material or the like from evaporating to suppress the ink viscosity increase due to drying or to suppress the degradation of the intermittent ejection stability due to ink adhesion at the tip of a nozzle. An ink in an embodiment of the present invention contains, as the solvent, a solvent A having a solubility in water at 20° C. of 5.00 g/100 g-$H_2O$ or less and a solvent B other than the solvent A. In the present specification, the solvent A is also called "poorly water-soluble solvent".

(Solvent A)

A poorly water-soluble solvent (solvent A) exhibits solubility in water but dissolves in a trace amount. When water in an ink evaporates to increase the concentration of a poorly water-soluble solvent in the ink, the poorly water-soluble solvent cannot be completely dissolved in the ink and is separated from the ink. The tip of a nozzle when recording is not performed (hereinafter called "unused nozzle") is exposed to the atmosphere, and thus water in an ink especially easily volatilize. At the tip of an unused nozzle, the poorly water-soluble solvent separated from the ink forms a film, and the film suppresses further evaporation of water in the ink. By such a function of the poorly water-soluble solvent, the ink can be stably ejected over a long period of time, and the intermittent ejection stability of the ink can be improved.

The poorly water-soluble solvent is a solvent having a solubility in water at 20° C. (also called "saturated solubility", hereinafter also simply called "solubility") of 5.00 g/100 g-$H_2O$ or less. As the poorly water-soluble solvent, at least an alcohol having a vapor pressure at 20° C. of 0.5 mmHg or less and a surface tension of 30.0 mN/m or more (hereinafter also called "poorly water-soluble alcohol") is used. By adding the poorly water-soluble alcohol having the above particular vapor pressure and surface tension to an ink, the poorly water-soluble alcohol can be separated from the ink in a condition in which water in the ink evaporates. In order to certainly exert such an effect, the poorly water-soluble alcohol preferably has a solubility of 4.00 g/100 g-$H_2O$ or less and more preferably 3.00 g/100 g-$H_2O$ or less.

The alcohol used as the poorly water-soluble solvent preferably has a solubility of 0.10 g/100 g-$H_2O$ or more and more preferably 0.50 g/100 g-$H_2O$ or more. When an alcohol having a solubility of 0.10 g/100 g-$H_2O$ or more is used as the poorly water-soluble solvent, the poorly water-soluble alcohol can dissolve in an ink at the initial condition (before evaporation of water in an ink). In order to certainly exert such an effect, a poorly water-soluble alcohol having a solubility of 1.00 g/100 g-$H_2O$ or more is more preferably used.

The alcohol used as the poorly water-soluble solvent has a vapor pressure at 20° C. of 0.5 mmHg or less and a surface tension of 30.0 mN/m or more as described above. When a poorly water-soluble alcohol having a vapor pressure at 20° C. of more than 0.5 mmHg forms a film on an ejection opening of a recording head, the film evaporates unfortunately, and the effect of suppressing water evaporation is reduced. In consideration of this point, the poorly water-soluble alcohol preferably has a vapor pressure at 20° C. of 0.2 mmHg or less and more preferably 0.1 mmHg or less. Meanwhile, a poorly water-soluble alcohol having a surface tension of less than 30.0 mN/m has a weak intermolecular force, and thus the poorly water-soluble alcohol cannot form a film even when separated from an ink. In consideration of this point, the poorly water-soluble alcohol preferably has a surface tension of 36.0 mN/m or more. The poorly water-soluble alcohol preferably has a surface tension of 50 mN/m or less.

The common logarithm (Log $P_A$) of the partition coefficient ($P_A$) of an alcohol used as the poorly water-soluble solvent (solvent A) is preferably 0.50 or more, more preferably 0.80 or more, and even more preferably 1.00 or more. Log $P_A$ of an alcohol used as the poorly water-soluble solvent is preferably 2.50 or less.

As the poorly water-soluble solvent (poorly water-soluble alcohol) having the above particular solubility, vapor pressure, and surface tension, an alcohol having a benzene ring is preferably used. The poorly water-soluble solvent may have two or more hydroxy groups, but preferably has one hydroxy group. In other words, the poorly water-soluble alcohol is preferably a monovalent alcohol having a benzene ring. Such a poorly water-soluble solvent has an advantage of capable of stably dispersing a pigment. The hydroxy group of a monovalent alcohol having a benzene ring may be directly bonded to the benzene ring or may be indirectly bonded to the benzene ring through another atomic group. As the monovalent alcohol having a benzene ring, at least one alcohol selected from the group consisting of phenoxy alkanols and phenyl alkanols is preferably used.

More specifically, the poorly water-soluble solvent more preferably includes, as the poorly water-soluble alcohol, at least one alcohol selected from the group consisting of benzyl alcohol, 2-phenoxyethanol, phenethyl alcohol, 1-phenoxy-2-propanol, 1-phenyl-2-propanol, 3-phenyl-1-propanol, and 4-phenyl-1-butanol. The solubility, vapor pressure, surface tension, and Log $P_A$ of such a poorly water-soluble alcohol are shown in Table 1. An ink in an embodiment of the present invention preferably contains, as the poorly water-soluble solvent, one poorly water-soluble alcohol, and more preferably contains one of the poorly water-soluble alcohols shown in Table 1. The ink may contain a poorly water-soluble solvent (solvent A) other than the poorly water-soluble alcohol.

TABLE 1

Table 1: Specific examples of poorly water-soluble alcohol

| Poorly water-soluble alcohol (solvent A) | Solubility (g/100 g-$H_2O$) | Vapor pressure (mmHg) | Surface tension (mN/m) | Log$P_A$ |
|---|---|---|---|---|
| 4-Phenyl-1-butanol | 0.10 | 0.0 | 38.3 | 2.40 |
| 3-Phenyl-1-propanol | 0.57 | 0.0 | 38.9 | 1.88 |
| 1-Phenyl-2-propanol | 0.58 | 0.1 | 37.3 | 1.71 |
| 1-Phenoxy-2-propanol | 1.10 | 0.0 | 37.7 | 1.51 |
| Phenethyl alcohol | 2.20 | 0.1 | 39.7 | 1.36 |
| 2-Phenoxyethanol | 2.67 | 0.0 | 40.0 | 1.16 |
| Benzyl alcohol | 4.29 | 0.1 | 39.0 | 1.03 |

In the ink, the content of the poorly water-soluble alcohol is 0.7 or more times the solubility in water at 20° C. in an equal amount to the ink. In other words, 100 g of the ink contains 0.7 or more times as much the poorly water-soluble alcohol as the solubility in water at 20° C. (saturated solubility). For example, when 2-phenoxyethanol, the solubility of which is 2.67 g/100 g-$H_2O$, is used as the solvent A, 1.87 g or more of 2-phenoxyethanol is preferably contained in 100 g of an ink. When a plurality of poorly water-soluble alcohols are contained in an ink, each of the poorly water-soluble alcohols is required to satisfy the above content range.

When an ink contains 0.7 or more times as much the poorly water-soluble alcohol as the solubility thereof, a sufficient volume of a film can be formed at the tip of an unused nozzle, and the effect of suppressing evaporation of water in an ink can be exerted. In order to certainly exert such an effect, the content of the poorly water-soluble alcohol in the ink is preferably 0.8 or more times the solubility and more preferably 0.9 or more times.

The poorly water-soluble alcohol may be partly dissolved in the solvent B in the ink. In this case, the poorly water-soluble alcohol is dissolved in the ink in a larger amount than the solubility in water. Hence, the ink can dissolve the poorly water-soluble alcohol in a larger amount than the solubility. However, in order to prevent the poorly water-soluble alcohol from insufficiently dissolving in an ink at the initial condition (before evaporation of water in an ink), the content of the poorly water-soluble alcohol in the ink is preferably 2.0 or less times the solubility in water at 20° C. in an equal amount to the ink. The content is more preferably 1.8 or less times and even more preferably 1.2 or less times. When the content of the poorly water-soluble alcohol in the ink is adjusted to 1.2 or less times the solubility, the poorly water-soluble alcohol can be prevented from insufficiently dissolving, and discharge defect due to the poorly water-soluble alcohol left in a nozzle of a recording head can be suppressed.

(Solvent B)

An ink in an embodiment of the present invention contains, in addition to the solvent A having a solubility of 5.00 g/100 g-$H_2O$ or less, a solvent B other than the solvent A, or a solvent B having a solubility in water at 20° C. of more than 5.00 g/100 g-$H_2O$. The solvent B dissolves in water more easily than the solvent A (poorly water-soluble solvent), and thus the solvent B is also called "highly water-soluble solvent" in the present specification.

As the highly water-soluble solvent, a highly water-soluble solvent having a solubility in water at 20° C. of 20.00 g/100 g-$H_2O$ or more can be suitably used. Such a highly water-soluble solvent having a high solubility in water has high moisture retaining property (hydration force), thus further suppresses evaporation of water in an ink, and can further suppress the ink viscosity increase and ink adhesion to a nozzle due to drying. Hence, by adding a highly water-soluble solvent having a high solubility in water to an ink, the ink can be stably ejected over a long period of time, and the intermittent ejection stability of the ink can be further improved. The highly water-soluble solvent also has high affinity to a coloring material, and thus functions to improve the dispersion stability of the ink.

The highly water-soluble solvent (solvent B) can be exemplified by polyhydric alcohols, diethylene glycol ethers, and nitrogen-containing compounds. Examples of the polyhydric alcohol include alkanediols such as ethylene glycol (ethanediol), propanediols (1,2-, 1,3-), butanediols (1,2-, 1,3-, 1,4-), pentanediols (1,2-, 1,3-, 1,4-, 1,5-), and hexanediols (1,2-, 1,3-, 1,4-, 1,5-, 1,6-), diethylene glycol, triethylene glycol, tetraethylene glycol, dipropylene glycol, tripropylene glycol, polyethylene glycol, polypropylene glycol, thiodiglycol, glycerol, diglycerol, and 1,2,6-hexanetriol. Examples of the diethylene glycol ether include diethylene glycol monomethyl ether and diethylene glycol monoethyl ether. Examples of the nitrogen-containing compound include 2-pyrrolidone and N-methyl-2-pyrrolidone. The ink can contain one or more highly water-soluble solvents.

The highly water-soluble solvent (solvent B) preferably includes at least one solvent selected from the group consisting of glycerol, triethylene glycol, ethylene glycol, diethylene glycol, propylene glycol, methyl carbitol, 2-pyrrolidone, carbitol, N-methyl-2-pyrrolidone, and diglycerol.

(Relationship Between Content of Solvent B and Partition Coefficient)

When an ink contains a surfactant having an HLB value of 9.0 or less, the surfactant dissolves in a poorly water-soluble solvent. As a result, the poorly water-soluble solvent has a lower surface tension to fail to form the above film, and the intermittent ejection stability degrades. To address this, an ink in an embodiment of the present invention contains the solvent B having such a partition coefficient ($P_B$) as to satisfy the relationship of the equation (1) between the content (x; % by mass) of the solvent B based on the total mass of the ink and the partition coefficient ($P_A$) of the solvent A (poorly water-soluble alcohol).

$$1.44 \text{ Log } P_A - 0.1x - 3.4 \leq \text{Log } P_B \leq -0.6 \tag{1}$$

When a poorly water-soluble solvent forms a film as water in an ink evaporates, an aqueous phase and an oil phase are separated. At this time, when the highly water-soluble solvent has a partition coefficient ($P_B$) within the above range, the solubility of the surfactant in the aqueous phase increases, and the amount of the surfactant dissolved in the poorly water-soluble solvent as the oil phase decreases. As a result, the poorly water-soluble solvent has a higher surface tension and can form a film, and thus the intermittent ejection stability is supposed to be improved. If Log $P_B$ is smaller than the value at the left side of the equation (1), the solubility of the surfactant in the aqueous phase does not increase, and the improvement effect of the intermittent ejection stability is not exerted. If Log $P_B$ is larger than −0.6, the highly water-soluble solvent itself dissolves in the poorly water-soluble solvent, and the improvement effect of the intermittent ejection stability is not exerted.

As shown in the equation (1), the range of necessary Log $P_B$ varies with the content (x) of the highly water-soluble solvent (solvent B). When the content of the highly water-soluble solvent is large, the solubility of the surfactant in the aqueous phase accordingly increases. In other words, when a solvent has a small partition coefficient ($P_B$) but is contained in an ink at a high content (x), the required solubility of the surfactant in an aqueous phase to improve the intermittent ejection stability can be obtained. Meanwhile, the upper limit of the partition coefficient ($P_B$) of the highly water-soluble solvent is independent of the content of the highly water-soluble solvent. At the upper limit, the highly water-soluble solvent equally dissolves in the aqueous phase and the oil phase. Even when the content of the highly water-soluble solvent increases, the concentration in the oil phase increases as the concentration in the aqueous phase increases, and the effect is supposed to compensate.

The range of necessary Log $P_B$ varies with the partition coefficient ($P_A$) of a poorly water-soluble alcohol used as the solvent A. This is because the solubility of the surfactant in a poorly water-soluble alcohol varies with the partition coefficient ($P_A$) of the poorly water-soluble alcohol. The partition coefficient ($P_B$) of a highly water-soluble solvent is preferably within a range satisfying the relationship of the equation (3) between the partition coefficient ($P_A$) of a poorly water-soluble alcohol and a content (x) of the highly water-soluble solvent.

$$1.44 \text{ Log } P_A - 0.1x - 3.1 \leq \text{Log } P_B \leq -0.6 \tag{3}$$

Specific examples of candidate highly water-soluble solvents and Log $P_B$ thereof are shown in Table 2.

TABLE 2

Table 2: Specific examples of highly water-soluble alcohol

| Highly water-soluble solvent (solvent B) | Log$P_B$ |
|---|---|
| Carbitol | −0.62 |
| 2-Pyrrolidone | −1.01 |
| Methyl carbitol | −1.16 |
| Propylene glycol | −1.34 |
| Diethylene glycol | −1.51 |
| Ethylene glycol | −1.69 |
| Triethylene glycol | −1.87 |
| Glycerol | −2.32 |
| Diglycerol | −2.61 |

(Partition Coefficient of Mixture of Two or More Solvents B)

When two or more highly water-soluble solvents (solvents B) are used, the partition coefficient of a mixture of the two or more highly water-soluble solvents is used as Log $P_B$ in the equations (1) and (3). The partition coefficient of a mixture of two or more highly water-soluble solvents can be calculated in accordance with the equation (4) for which the partition coefficient of each highly water-soluble solvent is substituted.

$$\text{Partition coefficient of mixture of highly water-soluble solvents} = \frac{C_1 \frac{P_1}{1+P_1} + C_2 \frac{P_2}{1+P_2} + \ldots + C_n \frac{P_n}{1+P_n}}{C_1 \frac{1}{1+P_1} + C_2 \frac{1}{1+P_2} + \ldots + C_n \frac{1}{1+P_n}} \quad (4)$$

Here, each solvent in a mixture of highly water-soluble solvents is assigned by a number in any order, and the solvents are represented by a first solvent, a second solvent, . . . , and a n-th solvent. In the equation (4), $C_1$, $C_2$, . . . , and $C_n$ represent the concentration of the first solvent, the concentration of the second solvent, . . . , and the concentration of the n-th solvent, respectively. $P_1$, $P_2$, . . . , and $P_n$ represent the partition coefficient of the first solvent, the partition coefficient of the second solvent, . . . , and the partition coefficient of the n-th solvent, respectively.

The common logarithm (Log $P_B$) of the partition coefficient ($P_B$) of a highly water-soluble solvent or a mixture of two or more highly water-soluble solvents can be within the range of the equation (1), and is specifically preferably −3.00 or more to −0.60 or less and more preferably −2.50 or more to −0.60 or less.

As the poorly water-soluble solvent (solvent A) and the highly water-soluble solvent (solvent B), specifically, the following combinations are more preferably used. In other words, the solvent A is preferably 2-phenoxyethanol. In this case, the solvent B preferably includes at least one solvent selected from the group consisting of glycerol, triethylene glycol, ethylene glycol, diethylene glycol, propylene glycol, 2-pyrrolidone, and carbitol. The solvent A is also preferably 1-phenoxy-2-propanol. In this case, the solvent B preferably includes at least one solvent selected from the group consisting of triethylene glycol, ethylene glycol, diethylene glycol, propylene glycol, and carbitol.

[Coloring Material]

The coloring material includes a dye and a pigment. As the dye and the pigment, a dye and a pigment conventionally used in an ink for ink jet can be suitably used. In addition to known dyes and pigments, a newly developed or synthesized dye or pigment can also be used.

(Dye)

The dye may have any molecular structure or the like, and a water-soluble dye is preferably used. For example, the following yellow, magenta, cyan, and black dyes can be suitably used.

Examples of the yellow dye include (1) acid dyes such as C.I. Acid Yellow 1, 3, 7, 11, 17, 23, 25, 29, 36, 38, 40, 42, 44, 76, 98, and 99; (2) direct dyes such as C.I. Direct Yellow 8, 11, 12, 27, 28, 33, 39, 44, 50, 58, 85, 86, 87, 88, 89, 98, 100, 110, 132, and 142; (3) reactive dyes such as C.I. Reactive Yellow 2, 3, 17, 25, 37, and 42; and (4) food dyes such as C.I. Food Yellow 3.

Examples of the magenta dye include (1) acid dyes such as C.I. Acid Red 6, 8, 9, 13, 14, 18, 26, 27, 32, 35, 37, 42, 51, 52, 80, 83, 87, 89, 92, 106, 114, 115, 133, 134, 145, 158, 198, 249, 265, and 289; (2) direct dyes such as C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, and 230; (3) reactive dyes such as C.I. Reactive Red 7, 12, 13, 15, 17, 20, 23, 24, 31, 42, 45, 46, and 59; and (4) food dyes such as C.I. Food Red 87, 92, and 94.

Examples of the cyan dye include (1) acid dyes such as C.I. Acid Blue 1, 7, 9, 15, 22, 23, 25, 29, 40, 43, 59, 62, 74, 78, 80, 90, 100, 102, 104, 117, 127, 138, 158, and 161; (2) direct dyes such as C.I. Direct Blue 1, 15, 22, 25, 41, 76, 77, 80, 86, 87, 90, 98, 106, 108, 120, 158, 163, 168, 199, and 226; and (3) reactive dyes such as C.I. Reactive Blue 4, 5, 7, 13, 14, 15, 18, 19, 21, 26, 27, 29, 32, 38, 40, 44, and 100.

Examples of the black dye include (1) acid dyes such as C.I. Acid Black 2, 48, 51, 52, 110, 115, and 156; (2) direct dyes such as C.I. Direct Black 17, 19, 22, 31, 32, 51, 62, 71, 74, 112, 113, 154, 168, and 195; (3) reactive dyes such as C.I. Reactive Black 1, 8, 12, and 13; and (4) food dyes such as C.I. Food Black 1 and 2.

In addition to the above dyes, other dyes including C.I. Direct Violet 107 (direct dye) as a violet dye can also be used, for example.

(Pigment)

As the pigment, any of inorganic pigments and organic pigments can be used, and one or more pigments can be used. The pigment may be a natural pigment or a synthetic pigment. Examples of the inorganic pigment include silica, alumina hydrate, titanium oxide, iron oxide, and carbon black. The carbon black includes furnace black, lamp black, acetylene black, and channel black, for example.

Examples of the organic pigment include (1) azo pigments such as an azo lake, an insoluble azo pigment, a condensed azo pigment, and a chelate azo pigment; (2) polycyclic pigments such as a phthalocyanine pigment, a perylene-perinone pigment, an anthraquinone pigment, a quinacridone pigment, a dioxazine pigment, a thioindigo pigment, an isoindolinone pigment, and a quinophthalone pigment; (3) dye lakes such as a basic dye lake and an acid dye lake; and (4) pigments other than the pigments in (1) to (3), such as a nitro pigment, a nitroso pigment, an aniline black, and a daylight fluorescent pigment.

The organic pigment is exemplified, in terms of color index (C.I.) numbers, by (1) yellow pigments such as C.I. Pigment Yellow 74, 93, 109, 110, 128, and 138; (2) magenta pigments such as C.I. Pigment Red 122, 202, and 209; (3) cyan pigments such as C.I. Pigment Blue 15:3 and 60; (4) black pigments such as C.I. Pigment Black 7; (5) orange pigments such as C.I. Pigment Orange 36 and 43; and (6) green pigments such as C.I. Pigment Green 7 and 36. Pigments not described in the color index but dispersible in water can also be used.

To prepare an ink, a dry pigment, for example, in a powder, granular, or massive form, a wet cake pigment, or a slurry pigment can be used. In terms of a dispersion manner in an ink, the pigment is exemplified by a resin-dispersion type pigment containing a resin as a dispersant and a self-dispersion type pigment (self-dispersible pigment) in which hydrophilic groups are bonded directly or through an additional atomic group to the surface of pigment particles. In an ink in an embodiment of the present invention, a self-dispersible pigment is preferably used. Examples of the hydrophilic group include a carboxylic acid group (—COOM), a sulfonic acid group (—SO$_3$M), and a phosphonic acid group (—PO$_3$HM, —PO$_3$M$_2$). In the formulae, "M" is preferably a hydrogen atom, an alkali metal, ammonium, or an organic ammonium. Examples of the additional atomic group (—R—) include alkylene groups having 1 to 12 carbon atoms, arylene groups such as a phenylene group and a naphthylene group, an amido group, a sulphonyl group, an amino group, an imino group, a carbonyl group, an ester group, and an ether group. Combination groups of them can also be exemplified. When an ionic group forms a salt, the salt in an ink may be dissociated partly or completely.

A self-dispersible pigment having an average particle diameter of 50 nm or more to 250 nm or less is preferably used in order to improve the storage stability of an ink and to prevent nozzles from clogging. The average particle diameter of a pigment can be determined with a particle size analyzer using a dynamic light scattering method. The particle size analyzer is exemplified by Fiber-Optics Particle Analyzer ("F-PAR1000" (trade name); manufactured by Otsuka Electronics Co., Ltd.).

The content of the coloring material in the ink is not limited to particular values, can be appropriately set depending on a type of the coloring material, demand characteristics of the ink, or the like, and is preferably 1.0% by mass or more to 7.0% by mass or less based on the total mass of the ink. When the content of the coloring material in the ink is 1.0% by mass or more, a recorded product can have an intended image density. When the content of the coloring material in the ink is 7.0% by mass or less, the ink has good preservability or ejection properties.

[Water]

An ink in an embodiment of the present invention is an aqueous ink containing water as an aqueous medium. As the water, deionized water (ion-exchanged water) is preferably used. The content (% by mass) of the water in the ink is preferably 70% by mass or more to 90% by mass or less and more preferably 72% by mass or more to 89% by mass or less based on the total mass of the ink.

[Other Additives]

An ink in an embodiment of the present invention may contain additives other than the above surfactant, solvent, and coloring material depending on a purpose. Such an additive is exemplified by a fungicide, a surface tension regulator, a pH adjuster, a rust inhibitor, an antiseptic, an antioxidant, an anti-reduction agent, and a salt.

As the fungicide, benzisothiazolin-3-one (manufactured by Lonza Japan; trade name: Proxel XL-2 (S)) can be used, for example. When a fungicide is used, the content of the fungicide is preferably 0.01% by mass or more to 0.10% by mass or less based on the total mass of the ink.

As the surface tension regulator, 1,2-hexanediol can be used, for example. When a surface tension regulator is used, the content of the surface tension regulator is 1.0% by mass or more to 5.0% by mass or less based on the total mass of the ink.

[Viscosity]

An ink in an embodiment of the present invention preferably has a viscosity of 1.5 mPa·s or more to 3.0 mPa·s or less. When the ink, especially a pigment ink, has a viscosity of 1.5 mPa·s or more, the sedimentation rate of pigment particles can be reduced, and the pigment particles are unlikely to settle down. An ink having a viscosity of 3.0 mPa·s or less has a higher flowability and accordingly can have a higher ejection stability. From these viewpoints, the ink preferably has a viscosity of 1.5 mPa·s or more to 2.5 mPa·s or less and more preferably 1.5 mPa·s or more to 2.0 mPa·s or less. In the present specification, the viscosity of an ink is determined in accordance with JIS Z 8803 at a temperature of 25° C. by using an E-type viscometer (for example, "RE-80L viscometer" (trade name); manufactured by Toki Sangyo). The viscosity of an ink can be adjusted by the types and amounts of a solvent and a surfactant contained in the ink.

<Ink Cartridge>

An ink cartridge in an embodiment of the present invention includes an ink and an ink storage portion storing the ink. The ink stored in the ink storage portion is the ink described in an embodiment of the present invention. FIG. 1 is a schematic sectional view showing an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, which communicate with each other through a communication hole 18. The absorber storage chamber 16 communicates with the ink supply port 12. The ink storage chamber 14 stores a liquid ink 20, and the absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

<Ink Jet Recording Method>

An ink jet recording method in an embodiment of the present invention is a method in which the above-described ink is ejected from an ink jet recording head to record an image on a recording medium. The system for ejecting the ink is exemplified by a system of applying mechanical energy to an ink and a system of applying thermal energy to an ink. In the method, a system of applying thermal energy to an ink to eject the ink is preferably adopted. The ink jet recording method may include known steps except that the above-described ink is used.

(Recording Head)

The recording head is preferably a thermal recording head including a plurality of nozzle flow paths formed by partition nozzle walls, a plurality of ejection openings formed in communication with the nozzle flow paths, and heaters provided inside the corresponding nozzle flow paths. In the recording head having such a structure, an ink loaded in a nozzle flow path is heated by a heater, and a pressure of bubbles generated by heat can be used to eject the ink as droplets from an ejection opening. The above-described ink used in the ink jet recording method has excellent intermittent ejection stability. Hence, the method can suitably use a line head as the recording head, and can more suitably use a thermal line head.

Each ejection opening preferably has an opening area of 10 $\mu m^2$ or more to 500 $\mu m^2$ or less, more preferably 10 $\mu m^2$ or more to 350 $\mu m^2$ or less, and even more preferably 100 $\mu m^2$ or more to 350 $\mu m^2$ or less. When the ejection opening has an opening area within the range, the ink can be ejected in an ejection volume of 0.5 $\mu L$ or more, more preferably 3.0 $\mu L$ or more to 10.0 $\mu L$ or less.

A plurality of nozzle flow paths form a nozzle array. The number of nozzle flow paths forming a nozzle array is not limited to particular values, but in order to exert the effect of the invention, the total number of nozzles per nozzle array is preferably 1,200 or more. More specifically, the number of nozzles per inch is preferably 600 or more to 2,400 or less. An apparatus having such a structure can achieve a resolution of 600 dpi or more.

The heater is a heating means for heating an ink loaded in a nozzle flow path to form bubbles. As the heater, a resistor (for example, a resistor composed of tantalum nitride) can be used. To the heater, an electrode composed of aluminum or the like is connected for energization, and to the electrode, a switching transistor for controlling the energization to the heater is connected. The switch transistor is driven under control by an IC including a circuit such as a control gate element and is driven in a certain pattern in response to a signal from the outside of the head.

(Recording Apparatus)

The recording apparatus for implementing the ink jet recording method in an embodiment of the present invention may have any structure. For example, a commercially available ink jet recording apparatus can be suitably used. The recording apparatus is equipped with a recording head for ejecting an ink and a tank for storing the ink. While both the recording head and a recording medium to be recorded are conveyed, an ink supplied from the tank is ejected from nozzles in the recording head, and thus any image can be formed. Typically, a plurality of tanks are installed, and various color inks can be appropriately used for recording to form various color images.

According to the present invention, an aqueous ink containing a surfactant having a low HLB value but having excellent intermittent ejection stability, an ink cartridge including the aqueous ink, and an ink jet recording method using the aqueous ink can be provided.

EXAMPLES

The present invention will next be described more specifically with reference to examples and comparative examples. The invention is not intended to be limited to the constitutions of the following examples. In the following description, "part" and "%" are based on mass unless otherwise specified.

Example 1

In a container, 5.0 parts of a coloring material, 2.7 parts of a poorly water-soluble solvent, 5.0 parts of a highly water-soluble solvent, and 0.2 part of a surfactant were placed, and pure water (ion-exchanged water) was added to make a total of 100.0 parts. The whole was stirred with a stirrer for 30 minutes. The mixture was then filtered through a membrane filter with a pore size of 1 μm, giving an ink of Example 1. As the coloring material, a commercially available dispersion liquid of aqueous self-dispersible magenta pigment (manufactured by Cabot; trade name: CAB-O-JET465M) was used. The pigment dispersion liquid was a dispersion liquid containing about 15% of a magenta pigment in terms of solid content as the coloring material. As the poorly water-soluble solvent, 2-phenoxyethanol was used. 2-Phenoxyethanol had a solubility in water (20° C.) of 2.67 g/100 g-$H_2O$. The ink of Example 1 contained 2-phenoxyethanol in a substantially equal amount to the solubility. As the highly water-soluble solvent, triethylene glycol was used. Triethylene glycol had a solubility in water (20° C.) of 20 g/100 g-$H_2O$ or more and a Log partition coefficient ($P_B$) of −1.87. As the surfactant, a surfactant having an HLB value of 8.0 (manufactured by Air Products and Chemicals; trade name: Dinol 800) was used.

Examples 2 to 24

The same procedure as in Example 1 was performed except that components shown in upper rows in Tables 3-1 to 3-4 (unit: parts) were used as ink components, giving inks of Examples 2 to 24.

Comparative Examples 1 to 15

The same procedure as in Example 1 was performed except that components shown in upper rows in Tables 4-1 and 4-2 (unit: parts) were used as ink components, giving inks of Comparative Examples 1 to 15. In Comparative Examples 11 to 15, solvents shown in Table 5 were used as the poorly water-soluble solvent having a solubility in water at 20° C. of 5.00 g/100 g-$H_2O$ or less.

"Acetylenol E40" in Tables 3-1 to 3-4 and Tables 4-1 and 4-2 is a trade name of Kawaken Fine Chemicals and is a surfactant having an HLB value of 9.5. Tables show solubilities and values of content/solubility of poorly water-soluble solvents, common logarithms of respective partition coefficients of poorly water-soluble solvents and highly water-soluble solvents (Log $P_A$ and Log $P_B$), and values at the left side of the equation (1).

TABLE 3-1

Table 3-1: Ink formulation and properties

| | | Example | | | | | |
|---|---|---|---|---|---|---|---|
| | | 1 | 2 | 3 | 4 | 5 | 6 |
| Coloring material | Pigment | 5.0 | 5.0 | 5.0 | 5.0 | 5.0 | 5.0 |
| Surfactant | Dinol 800 (HLB 8.0) | 0.2 | 0.2 | 0.2 | 0.2 | 0.2 | 0.2 |
| | Acetylenol E40 (HLB 9.5) | | | | | | |
| Poorly water-soluble solvent (solvent A) | 2-Phenoxyethanol | 2.7 | 2.7 | 2.7 | 2.7 | 2.7 | 2.7 |
| | 1-Phenoxy-2-propanol | | | | | | |
| | Benzyl alcohol | | | | | | |
| | Phenethyl alcohol | | | | | | |
| | 3-Phenyl-1-propanol | | | | | | |
| | 1-Pentanol | | | | | | |
| | Linalool | | | | | | |
| | Phenylacetaldehyde | | | | | | |
| | p-Anisaldehyde | | | | | | |
| | Benzyl acetate | | | | | | |
| Highly water-soluble solvent (solvent B) | Glycerol | | | | | | |
| | Triethylene glycol | 5.0 | | | | | |
| | Ethylene glycol | | 5.0 | | | | |
| | Diethylene glycol | | | 5.0 | | | |
| | Propylene glycol | | | | 5.0 | | |
| | 2-Pyrrolidone | | | | | 5.0 | |
| | Carbitol | | | | | | 5.0 |
| | Butyl triglycol | | | | | | |

TABLE 3-1-continued

Table 3-1: Ink formulation and properties

|  | Example | | | | | |
|---|---|---|---|---|---|---|
|  | 1 | 2 | 3 | 4 | 5 | 6 |
| Water | 87.1 | 87.1 | 87.1 | 87.1 | 87.1 | 87.1 |
| Solubility of solvent A (g/100 g-$H_2O$) | 2.67 | 2.67 | 2.67 | 2.67 | 2.67 | 2.67 |
| Content/solubility of solvent A | 1.0 | 1.0 | 1.0 | 1.0 | 1.0 | 1.0 |
| $LogP_A$ | 1.16 | 1.16 | 1.16 | 1.16 | 1.16 | 1.16 |
| $1.44 LogP_A - 0.1x - 3.4$ | −2.23 | −2.23 | −2.23 | −2.23 | −2.23 | −2.23 |
| $LogP_B$ | −1.87 | −1.69 | −1.51 | −1.34 | −1.01 | −0.62 |
| Evaluation | A | A | A | A | A | A |

TABLE 3-2

Table 3-2: Ink formulation and properties

|  |  | Example | | | | |
|---|---|---|---|---|---|---|
|  |  | 7 | 8 | 9 | 10 | 11 |
| Coloring material | Pigment | 5.0 | 5.0 | 5.0 | 5.0 | 5.0 |
| Surfactant | Dinol 800 (HLB 8.0) | 0.2 | 0.2 | 0.2 | 0.2 | 0.2 |
|  | Acetylenol E40 (HLB 9.5) |  |  |  |  |  |
| Poorly water-soluble solvent (solvent A) | 2-Phenoxyethanol | 2.7 | 2.7 | 2.7 | 2.7 | 2.7 |
|  | 1-Phenoxy-2-propanol |  |  |  |  |  |
|  | Benzyl alcohol |  |  |  |  |  |
|  | Phenethyl alcohol |  |  |  |  |  |
|  | 3-Phenyl-1-propanol |  |  |  |  |  |
|  | 1-Pentanol |  |  |  |  |  |
|  | Linalool |  |  |  |  |  |
|  | Phenylacetaldehyde |  |  |  |  |  |
|  | p-Anisaldehyde |  |  |  |  |  |
|  | Benzyl acetate |  |  |  |  |  |
| Highly water-soluble solvent (solvent B) | Glycerol | 3.8 | 10.0 |  | 2.5 | 7.5 |
|  | Triethylene glycol | 3.8 |  |  | 2.5 |  |
|  | Ethylene glycol |  |  |  |  |  |
|  | Diethylene glycol |  |  |  |  |  |
|  | Propylene glycol |  |  |  |  |  |
|  | 2-Pyrrolidone |  |  |  |  |  |
|  | Carbitol |  |  | 10.0 |  |  |
|  | Butyl triglycol |  |  |  |  |  |
| Water |  | 84.5 | 82.1 | 82.1 | 87.1 | 84.6 |
| Solubility of solvent A (g/100 g-$H_2O$) |  | 2.67 | 2.67 | 2.67 | 2.67 | 2.67 |
| Content/solubility of solvent A |  | 1.0 | 1.0 | 1.0 | 1.0 | 1.0 |
| $LogP_A$ |  | 1.16 | 1.16 | 1.16 | 1.16 | 1.16 |
| $1.44 LogP_A - 0.1x - 3.4$ |  | −2.49 | −2.73 | −2.73 | −2.23 | −2.48 |
| $LogP_B$ |  | −2.04 | −2.32 | −0.62 | −2.04 | −2.32 |
| Evaluation |  | A | A | A | B | B |

TABLE 3-3

Table 3-3: Ink formulation and properties

|  |  | Example | | | | | | | |
|---|---|---|---|---|---|---|---|---|---|
|  |  | 12 | 13 | 14 | 15 | 16 | 17 | 18 | 19 |
| Coloring material | Pigment | 5.0 | 5.0 | 5.0 | 5.0 | 5.0 | 5.0 | 5.0 | 5.0 |
| Surfactant | Dinol 800 (HLB 8.0) | 0.2 | 0.2 | 0.2 | 0.2 | 0.2 | 0.2 | 0.2 | 0.2 |
|  | Acetylenol E40 (HLB 9.5) |  |  |  |  |  |  |  |  |
| Poorly water-soluble solvent (solvent A) | 2-Phenoxyethanol |  |  |  |  |  |  |  |  |
|  | 1-Phenoxy-2-propanol | 1.1 | 1.1 | 1.1 | 1.1 | 1.1 | 1.1 | 1.1 | 1.1 |
|  | Benzyl alcohol |  |  |  |  |  |  |  |  |
|  | Phenethyl alcohol |  |  |  |  |  |  |  |  |
|  | 3-Phenyl-1-propanol |  |  |  |  |  |  |  |  |
|  | 1-Pentanol |  |  |  |  |  |  |  |  |
|  | Linalool |  |  |  |  |  |  |  |  |
|  | Phenylacetaldehyde |  |  |  |  |  |  |  |  |
|  | p-Anisaldehyde |  |  |  |  |  |  |  |  |
|  | Benzyl acetate |  |  |  |  |  |  |  |  |

TABLE 3-3-continued

Table 3-3: Ink formulation and properties

| | | Example | | | | | | | |
|---|---|---|---|---|---|---|---|---|---|
| | | 12 | 13 | 14 | 15 | 16 | 17 | 18 | 19 |
| Highly water-soluble solvent (solvent B) | Glycerol | | | | | | | | |
| | Triethylene glycol | | | | 10.0 | | | | |
| | Ethylene glycol | | | | | | 5.0 | | 7.5 |
| | Diethylene glycol | | | 7.5 | | | | 5.0 | |
| | Propylene glycol | 5.0 | | | | | | | |
| | 2-Pyrrolidone | | | | | | | | |
| | Carbitol | | 5.0 | | | 10.0 | | | |
| | Butyl triglycol | | | | | | | | |
| Water | | 88.7 | 88.7 | 86.2 | 83.7 | 83.7 | 88.7 | 88.7 | 86.2 |
| Solubility of solvent A (g/100 g-$H_2O$) | | 1.10 | 1.10 | 1.10 | 1.10 | 1.10 | 1.10 | 1.10 | 1.10 |
| Content/solubility of solvent A | | 1.0 | 1.0 | 1.0 | 1.0 | 1.0 | 1.0 | 1.0 | 1.0 |
| $LogP_A$ | | 1.51 | 1.51 | 1.51 | 1.51 | 1.51 | 1.51 | 1.51 | 1.51 |
| $1.44LogP_A - 0.1x - 3.4$ | | −1.73 | −1.73 | −1.98 | −2.23 | −2.23 | −1.73 | −1.73 | −1.98 |
| $LogP_B$ | | −1.34 | −0.62 | −1.51 | −1.87 | −0.62 | −1.69 | −1.51 | −1.69 |
| Evaluation | | A | A | A | A | A | B | B | B |

TABLE 3-4

Table 3-4: Ink formulation and properties

| | | Example | | | | |
|---|---|---|---|---|---|---|
| | | 20 | 21 | 22 | 23 | 24 |
| Coloring material | Pigment | 5.0 | 5.0 | 5.0 | 5.0 | 5.0 |
| Surfactant | Dinol 800 (HLB 8.0) | 0.2 | 0.2 | 0.2 | 0.2 | 0.2 |
| | Acetylenol E40 (HLB 9.5) | | | | | |
| Poorly water-soluble solvent (solvent A) | 2-Phenoxyethanol | 2.0 | 3.2 | | | |
| | 1-Phenoxy-2-propanol | | | | | |
| | Benzyl alcohol | | | 4.3 | | |
| | Phenethyl alcohol | | | | 2.0 | |
| | 3-Phenyl-1-propanol | | | | | 1.0 |
| | 1-Pentanol | | | | | |
| | Linalool | | | | | |
| | Phenylacetaldehyde | | | | | |
| | p-Anisaldehyde | | | | | |
| | Benzyl acetate | | | | | |
| Highly water-soluble solvent (solvent B) | Glycerol | | | | | |
| | Triethylene glycol | | | | | |
| | Ethylene glycol | | | | | |
| | Diethylene glycol | | | | | |
| | Propylene glycol | 5.0 | 5.0 | 5.0 | 5.0 | 5.0 |
| | 2-Pyrrolidone | | | | | |
| | Carbitol | | | | | |
| | Butyl triglycol | | | | | |
| Water | | 87.8 | 86.6 | 85.5 | 87.8 | 88.8 |
| Solubility of solvent A (g/100 g-$H_2O$) | | 2.67 | 2.67 | 4.29 | 2.20 | 0.57 |
| Content/solubility of solvent A | | 0.7 | 1.2 | 1.0 | 0.9 | 1.8 |
| $LogP_A$ | | 1.16 | 1.16 | 1.03 | 1.36 | 1.88 |
| $1.44LogP_A - 0.1x - 3.4$ | | −2.23 | −2.23 | −2.42 | −1.94 | −1.19 |
| $LogP_B$ | | −1.34 | −1.34 | −1.34 | −1.34 | −1.34 |
| Evaluation | | B | A | B | A | A |

TABLE 4-1

Table 4-1: Ink formulation and properties

| | | Comparative Example | | | | | | |
|---|---|---|---|---|---|---|---|---|
| | | 1 | 2 | 3 | 4 | 5 | 6 | 7 |
| Coloring material | Pigment | 5.0 | 5.0 | 5.0 | 5.0 | 5.0 | 5.0 | 5.0 |
| Surfactant | Dinol 800 (HLB 8.0) | 0.2 | 0.2 | 0.2 | 0.2 | 0.2 | 0.2 | 0.2 |
| | Acetylenol E40 (HLB 9.5) | | | | | | | |

TABLE 4-1-continued

Table 4-1: Ink formulation and properties

|  |  | Comparative Example | | | | | | |
|---|---|---|---|---|---|---|---|---|
|  |  | 1 | 2 | 3 | 4 | 5 | 6 | 7 |
| Poorly water-soluble solvent (solvent A)) | 2-Phenoxyethanol | 2.7 | 2.7 | 2.7 | 2.7 | | | |
| | 1-Phenoxy-2-propanol | | | | | 1.1 | 1.1 | 1.1 |
| | Benzyl alcohol | | | | | | | |
| | Phenethyl alcohol | | | | | | | |
| | 3-Phenyl-1-propanol | | | | | | | |
| | 1-Pentanol | | | | | | | |
| | Linalool | | | | | | | |
| | Phenylacetaldehyde | | | | | | | |
| | p-Anisaldehyde | | | | | | | |
| | Benzyl acetate | | | | | | | |
| Highly water-soluble solvent (solvent B) | Glycerol | 5.0 | | | | 7.5 | 10.0 | |
| | Triethylene glycol | | | | | | | |
| | Ethylene glycol | | | | | | | |
| | Diethylene glycol | | | | | | | |
| | Propylene glycol | | | | | | | |
| | 2-Pyrrolidone | | | | | | | |
| | Carbitol | | 3.3 | | 6.7 | | | 6.7 |
| | Butyl triglycol | | 1.7 | 5.0 | 3.3 | | | 3.3 |
| Water | | 87.1 | 87.1 | 87.1 | 82.1 | 86.2 | 83.7 | 83.7 |
| Solubility of solvent A (g/100 g-H$_2$O) | | 2.67 | 2.67 | 2.67 | 2.67 | 1.10 | 1.10 | 1.10 |
| Content/solubility of solvent A | | 1.0 | 1.0 | 1.0 | 1.0 | 1.0 | 1.0 | 1.0 |
| LogP$_A$ | | 1.16 | 1.16 | 1.16 | 1.16 | 1.51 | 1.51 | 1.51 |
| 1.44LogP$_A$-0.1x-3.4 | | -2.23 | -2.23 | -2.23 | -2.73 | -1.98 | -2.23 | -2.23 |
| LogP$_B$ | | -2.32 | -0.52 | 0.08 | -0.52 | -2.32 | -2.32 | -0.52 |
| Evaluation | | C | C | C | C | C | C | C |

TABLE 4-2

Table 4-2: Ink formulation and properties

|  |  | Comparative Example | | | | | | | |
|---|---|---|---|---|---|---|---|---|---|
|  |  | 8 | 9 | 10 | 11 | 12 | 13 | 14 | 15 |
| Coloring material | Pigment | 5.0 | 5.0 | 5.0 | 5.0 | 5.0 | 5.0 | 5.0 | 5.0 |
| Surfactant | Dinol 800 (HLB 8.0) | | | 0.2 | 0.2 | 0.2 | 0.2 | 0.2 | 0.2 |
| | Acetylenol E40 (HLB 9.5) | 0.2 | 0.2 | | | | | | |
| Poorly water-soluble solvent (solvent A) | 2-Phenoxyethanol | 2.7 | 2.7 | 1.5 | | | | | |
| | 1-Phenoxy-2-propanol | | | | | | | | |
| | Benzyl alcohol | | | | | | | | |
| | Phenethyl alcohol | | | | | | | | |
| | 3-Phenyl-1-propanol | | | | | | | | |
| | 1-Pentanol | | | | 2.2 | | | | |
| | Linalool | | | | | 1.5 | | | |
| | Phenylacetaldehyde | | | | | | 2.2 | | |
| | p-Anisaldehyde | | | | | | | 0.4 | |
| | Benzyl acetate | | | | | | | | 0.3 |
| Highly water-soluble solvent (solvent B) | Glycerol | | 5.0 | | | | | | |
| | Triethylene glycol | | | | | | | | |
| | Ethylene glycol | | | | | | | | |
| | Diethylene glycol | | | | | | | | |
| | Propylene glycol | 5.0 | | 5.0 | 5.0 | 5.0 | 5.0 | 5.0 | 5.0 |
| | 2-Pyrrolidone | | | | | | | | |
| | Carbitol | | | | | | | | |
| | Butyl triglycol | | | | | | | | |
| Water | | 87.1 | 87.1 | 88.3 | 87.6 | 88.3 | 87.6 | 89.4 | 89.5 |
| Solubility of poorly water-soluble solvent | | 2.67 | 2.67 | 2.67 | 2.20 | 1.50 | 2.20 | 0.40 | 0.30 |
| Content/solubility of poorly water-soluble solvent | | 1.0 | 1.0 | 0.6 | 1.0 | 1.0 | 1.0 | 1.0 | 1.0 |
| LogP$_A$ | | 1.16 | 1.16 | 1.16 | 1.41 | 3.28 | 1.78 | 1.70 | 1.84 |
| 1.44LogP$_A$-0.1x-3.4 | | -2.23 | -2.23 | -2.23 | -1.87 | 0.82 | -1.34 | -1.45 | -1.25 |
| LogP$_B$ | | -1.34 | -2.32 | -1.34 | -1.34 | -1.34 | -1.34 | -1.34 | -1.34 |
| Evaluation | | C | C | C | C | C | C | C | C |

TABLE 5

Table 5: Poorly water-soluble solvents used in Comparative Examples

| Poorly water-soluble solvent (solvent A) | Solubility (g/100 g-H$_2$O) | Vapor pressure (mmHg) | Surface tension (mN/m) | Log partition coefficient |
|---|---|---|---|---|
| 1-Pentanol | 2.20 | 1.5 | 25.5 | 1.41 |
| Linalool | 1.50 | 0.2 | 26.6 | 3.28 |
| Phenylacetaldehyde | 2.20 | 0.4 | 35.9 | 1.78 |
| p-Anisaldehyde | 0.40 | 0.0 | 37.2 | 1.70 |
| Benzyl acetate | 0.30 | 0.2 | 35.9 | 1.84 |

Evaluation

The intermittent ejection stability of each ink prepared was evaluated. The evaluation method was as shown below.

An ink was charged in the tank of a recording head, and the recording head was installed in an ink jet recording apparatus. In an environment at 25° C. and a relative humidity of 50%, printing was performed on a recording medium. As the recording apparatus, a recording apparatus equipped with a thermal jet recording head having a 1,200-dpi, 1-inch nozzle array was used. The recording apparatus can control ink ejection, sweep the recording head, and convey a recording medium. The resolution for recording was set at 1,200 dpi (dot/inch) in a sub scanning direction and at 1,200 dpi in a main scanning direction. As the recording medium, plain paper for business, A4, manufactured by CANON KABUSHIKI KAISHA was used. An ink droplet had a volume of 4.8 picoliters. A nozzle had an opening area of 314 μm$^2$.

As for the evaluation procedure for intermittent ejection stability, first, a 1-inch square image was recorded on a recording medium. For the recording, the ejection frequency was set at 1 kHz. By the recording, the ink in nozzles of the recording head can be returned to the state before water evaporation. The apparatus was then stopped, and after a predetermined downtime, the ink was ejected only once from each nozzle of the recording head onto a recording medium. When the ink is normally ejected, a line having a length of 1 inch, which is the same as that of the nozzle array, is recorded. The line was visually observed to perform sensory evaluation on the basis of the following criteria. In the following criteria, a sample evaluated as "A" or "B" was regarded as an acceptable level, and a sample evaluated as "C" was regarded as an unacceptable level. The evaluation results are also shown in Tables 3 and Tables 4.

A: An ink was normally ejected from half or more of all nozzles even after downtime for 20 minutes or more.

B: An ink was normally ejected from half or more of all nozzles after downtime for less than 20 minutes and not less than 100 seconds.

C: An ink was not normally ejected from half or more of all nozzles after downtime for 100 seconds or more (the ink was largely curved or was not ejected).

Figure 2:
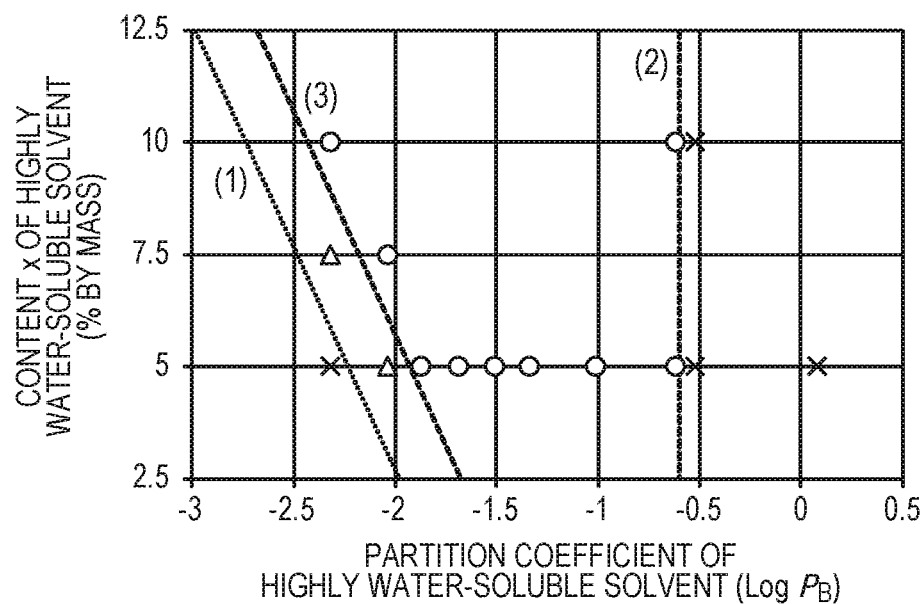
FIG. 2 is a graph showing the relationship between a Log partition coefficient ($P_B$) of a solvent B (highly water-soluble solvent) and intermittent ejection stability at a content when 2-phenoxyethanol was used as a solvent A (poorly water-soluble solvent).
Figure 3:
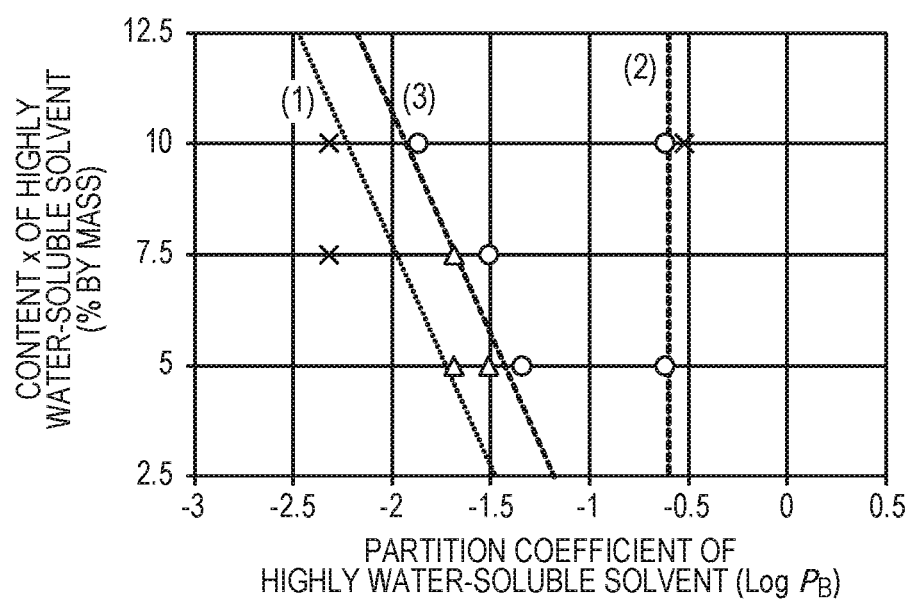
FIG. 3 is a graph showing the relationship between a Log partition coefficient ($P_B$) of a solvent B (highly water-soluble solvent) and intermittent ejection stability at a content when 1-phenoxy-2-propanol was used as the solvent A (poorly water-soluble solvent).

FIG. 2 is a graph showing the relationship between a Log partition coefficient (P$_B$) of a highly water-soluble solvent and intermittent ejection stability of a highly water-soluble solvent at a content in Examples 1 to 11 and Comparative Examples 1 to 4, in which 2-phenoxyethanol was used as the poorly water-soluble solvent. FIG. 3 is a graph showing the relationship between a Log P$_B$ of a highly water-soluble solvent and intermittent ejection stability of a highly water-soluble solvent at a content in Examples 12 to 19 and Comparative Examples 5 to 7, in which 1-phenoxy-2-propanol was used as the poorly water-soluble solvent. In FIG. 2 and FIG. 3, circular plots indicate evaluation A, triangle plots indicate evaluation B, and X-shaped plots indicate evaluation C. In FIG. 2 and FIG. 3, broken lines (1) are straight lines represented by Log P$_B$=1.44 Log P$_A$−0.1x−3.4 and indicate the lower limit of Log P$_B$ of the highly water-soluble solvent. In FIG. 2 and FIG. 3, broken lines (2) are straight lines represented by Log P$_B$=−0.6 and indicate the upper limit of Log P$_B$ of the highly water-soluble solvent. In FIG. 2 and FIG. 3, broken lines (3) are straight lines represented by Log P$_B$=1.44 Log P$_A$−0.1x−3.1 and indicate the lower limit of Log P$_B$ of the highly water-soluble solvent where better intermittent ejection stability is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-249829, filed Dec. 22, 2016, which is hereby incorporated by reference herein in its entirety.

What is claimed is:

1. An aqueous ink for ink jet comprising:
   (a) a coloring material;
   (b) a solvent; and
   (c) a surfactant having an HLB value of 9.0 or less,
   wherein the solvent includes (i) a solvent A having a solubility in water at 20° C. of 5.00 g/100 g-H$_2$O or less and (ii) a solvent B other than the solvent A,
   wherein the solvent A includes an alcohol having a vapor pressure at 20° C. of 0.5 mmHg or less and a surface tension at 25° C. of 30.0 mN/m or more,
   wherein a content of the alcohol in the aqueous ink is 0.7 or more times a solubility in water at 20° C. in an equal amount to the aqueous ink,
   wherein the solvent B has a partition coefficient (P$_B$) satisfying the relationship of the following the equation (3):

$$1.44 \log P_A - 0.1x - 3.1 \leq \log P_B \leq -0.6 \quad (3)$$

wherein, in the equation (3), P$_A$ represents a partition coefficient of the solvent A; and x represents a content (% by mass) of the solvent B based on a total mass of the aqueous ink, and
   wherein the alcohol is 1-phenoxy-2-propanol and the solvent B includes at least one selected from the group consisting of triethylene glycol, ethylene glycol, diethylene glycol, propylene glycol, and carbitol.

2. The aqueous ink according to claim 1, wherein the solubility of the alcohol is 3.00 g/100 g-H$_2$O or less.

3. An ink cartridge comprising:
   an ink; and
   an ink storage portion for storing the ink,
   wherein the ink is the aqueous ink according to claim 1.

4. An ink jet recording method comprising:
   ejecting an ink from an ink jet recording head to record an image on a recording medium,
   wherein the ink is the aqueous ink according to claim 1.

5. The ink jet recording method according to claim 4, wherein as the recording head, a thermal recording head including a plurality of nozzle flow paths formed by being partitioned with a nozzle wall, a plurality of ejection openings formed in communication with the nozzle flow paths, and heaters provided inside corresponding ones of the nozzle flow paths is used, the ink is heated by the heater, and a pressure of a bubble generated by heat is utilized to eject the ink from the ejection opening.

6. The ink jet recording method according to claim 5, wherein the recording head including the ejection openings each having an opening area of 10 μm² or more to 350 μm² or less is used, and the aqueous ink is ejected in an ejection volume of 3.0 μL or more to 10.0 μL or less from the recording head.

* * * * *